3,318,966
PRODUCTION OF ALKENYL BENZENES
Clifford William Capp, Ewell, and Roger Bryan Ward,
Banstead, England, assignors to The Distillers Corporation Limited, Edinburgh, Scotland, a British company
No Drawing. Filed Feb. 19, 1964, Ser. No. 345,864
Claims priority, application Great Britain, Mar. 14, 1963,
10,088/63
18 Claims. (Cl. 260—669)

This invention relates to the catalytic oxidative dehydrogenation of alkyl benzenes to produce alkenyl benzenes.

According to the present invention process for the production of an alkenyl benzene comprises reacting a mono- or dialkyl benzene in which the alkyl side chains contain separately at least two carbon atoms at an elevated temperature in the vapor phase, with molecular oxygen over an oxidation catalyst comprising an oxide of vanadium, while maintaining a molar ratio of oxygen to alkyl benzene of less than 10:1.

Suitable catalysts for use in this reaction include an oxide of vanadium alone or an oxide of vanadium in combination or admixture with an oxide of at least one other metal such as tin, cobalt, chromium, magnanese, uranium, tungsten, lead, bismuth or zinc. Such catalysts must therefore include an oxide of vanadium e.g. vanadium pentoxide and may include in addition one or more other metal oxides. The catalyst may thus take the form of a mixture of metal oxides or of a compound or compounds of vanadium, one of the other specified metals and oxygen e.g. tin vanadate, cobalt vanadate, chromium vanadate, vanadyl chromate, uranyl vanadate, vanadyl uranate, manganese vanadate, tungsten vandate, vandyl tungstate, zinc vanadate, lead vanadate and bismuth vanadate. Under the reaction conditions the mixed metal catalyst may be present in either or both forms. The catalyst may also contain other metal oxides or metal salts e.g. oxides of iron, sodium, potassium, cerium, nickel or the salts thereof. These additives may be added in the form of heat decomposable salts e.g. ferric nitrate.

The catalysts may be prepared in any suitable manner, for example by intimate admixture of the oxides or compounds which on heating decompose to form the oxides e.g. the oxalates. Alternatively the catalyst may be prepared by precipitation, for instance by adding an aqueous solution of a cationic salt of the desired metal e.g. chromium nitrate, to an aqueous solution or suspension of an anionic vanadium acid salt e.g. ammonium vanadate and recovering the resulting precipitate.

The catalyst may be deposited on a support material such as silica, alumina, or a diatomaceous earth e.g. Celite [1] is desired. For example alumina may be impregnated with a mixed solution of heat decomposable salts of the desired metal and of vanadium, e.g. the oxalates, and the resulting mixture heated to dryness whereupon the oxalates are decomposed into the oxides. The catalyst supports may be subjected to a pre-heat treatment before deposition of the catalyst.

In the process of this invention, an alkyl benzene as defined in admixture with molecular oxygen, is brought into contact with the catalyst in any suitable manner, for example in a fixed, moving or fluidised bed or in an adiabatic reactor. Suitable alkyl benzene starting materials may be for example, ethyl benzene, diethyl benzene or isopropyl benzene which result in the production of styrene, α-ethylstyrene, divinyl benzene or α-methylstyrene respectively. The concentration of alkyl benzene in the reaction mixture may vary within fairly wide limits, and may suitably be, for example, in the range 5 to 17% by volume.

[1] Registered trademark.

The concentration of oxygen in the reaction mixture may vary within fairly wide limits, and may suitably be, for example, in the range 2.5 to 17% by volume. The feed may also contain a gaseous diluent which is inert under the conditions of the reaction, and which may be, for example, nitrogen and/or steam. The oxygen may conveniently be supplied in the form of air.

The molar ratio of oxygen to alkyl benzene must be less than 10:1 and is preferably less than 3:1.

The reaction may suitably be carried out at temperatures in the range 200° C. to 600° C. The contact time may be, for example within the range 0.1 to 30 seconds. The reaction may be carried out at atmospheric pressure, superatmospheric pressure, or subatmospheric pressure.

The alkenyl benzene (formed in reaction according to this invention) may be recovered by any suitable means, for example by extraction into a solvent, or by liquefaction, if necessary with refrigeration and fractionation of the product.

The process of the invention is illustrated further by the following example in which parts by weight bear the same relationship to parts by volume as do grammes to millilitres.

Vanadium pentoxide (2 parts by weight) in water (15 parts) was heated to 60° C. and dissolved by addition of oxalic acid dihydrate (8 parts by weight), manganese acetate tetrahydrate (5.4 parts by weight), was dissolved in water (20 parts). The mixed solutions were used to impregnate commercial activated alumina (100 parts by weight, 8–14 mesh BS sieve). The product was dried for 1 hour at 120° C. and then heated at 400° C. for 2 hours in a stream of nitrogen.

A gaseous mixture of 8.2% by volume of ethylbenzene, 4.6% by volume of oxygen and 87.2% by volume of nitrogen was passed over the catalyst in a reactor at 350° C., the contact time being 5 seconds. The exit gas was cooled to 12° C. when the liquid condensate obtained contained 79% by weight of ethylbenzene and 20% by weight of styrene. The residual gas contained 0.5% by volume of styrene and 0.5% by volume of ethylbenzene. Thus 25% of the ethylbenzene fed was consumed and the efficiency to styrene was 93% based on ethylbenzene reacted.

We claim:
1. A process for the production of an alkenyl benzene which consists of reacting a mono or dialkyl benzene in which the alkyl moiety has separately at least two carbon atoms at an elevated temperature in the vapor phase with molecular oxygen in contact with an oxidation catalyst selected from the group consisting of an oxide of vanadium and an oxide of vanadium in combination or admixture with an oxide of tin, cobalt, chromium, manganese, uranium, tungsten, lead, bismuth or zinc while maintaining a molecular ratio of oxygen to alkyl benezene of less than 10:1.

2. A process according to claim 1 wherein the oxidation catalyst comprises manganese vanadate.

3. A process according to claim 1 wherein the catalyst is deposited on a support.

4. A process according to claim 3 wherein the support is selected from the group consisting of silica, alumina and a diatomaceous earth.

5. A process according to claim 3 wherein the support is subjected to pre-heat treatment before deposition of the catalyst.

6. A process according to claim 1 wherein the alkyl benzene is selected from the group consisting of ethyl benzene, diethyl benzene and isopropylbenzene.

7. A process according to claim 1 wherein the concentration of alkyl benzene in the reaction mixture is in the range 5–17% by volume.

8. A process according to claim 1 wherein the concentration of oxygen in the reaction mixture is in the range 2.5 to 17% by volume.

9. A process according to claim 1 wherein the reactant feed contains a gaseous diluent inert under the conditions of the reaction is added.

10. A process according to claim 9 wherein the gaseous diluent is nitrogen, steam and mixtures thereof.

11. A process according to claim 1 wherein the temperature is maintained in the range of from 200 to 500° C.

12. A process according to claim 1 wherein the reaction time is within the range 0.1 to 30 seconds.

13. A process according to claim 1 wherein the oxidation catalyst is an oxide of vanadium.

14. A process according to claim 13 wherein the oxide of vanadium is vanadium pentoxide.

15. A process for the production of an alkneyl benzene which consists of reacting a mono or dialkyl benzene in which the alkyl moiety has seperatly at least two carbon atoms at an elevated temperature in the vapor phase with molecular oxygen in contact with an oxidation catalyst selected from the group consisting of an oxide of vanadium, an oxide of vanadium in combination or admixture with an oxide of tin, cobalt, chromium, manganese, uranium, tungsten, lead, bismuth or zinc and an oxide of vanadium in combination or admixture with an oxide of tin, cobalt, chromum, manganese, uranium, tungsten, lead, bismuth or zinc and a metal oxide additive selected from the group consisting of oxides of iron, sodium, potassium, cerium, nickel and salts thereof.

16. A process according to 15 wherein the additives are added to the catalyst in the form of heat decomposable salts.

17. A process according to claim 16 wherein the heat decomposable salt is ferric nitrate.

18. A process for the production of an alkenyl benzene which consists of reacting 5 to 17% by volume of ethyl benzene, diethyl benzene or isopropylbenzene at a temperature of from 200 to 600° C. with 2.5 to 17% by volume of molecular oxygen in contact with an oxidation catalyst selected from the group consisting of vanadium pentoxide, tin vanadate, cobalt vanadate, chromium vanadate, vanadyl chromate, uranyl vanadate, vanadyl uranate, manganese vanadate, tungsten vanadate, vanadyl tungstate, zinc vanadate, lead vanadate and bismuth vanadate while maintaining a molecular ratio of oxygen to ethyl benzene, diethyl benzene or isopropylbenzene of less than 3:1.

References Cited by the Examiner

UNITED STATES PATENTS

| 3,185,740 | 5/1965 | Malick | 260—669 X |
| 3,207,806 | 9/1965 | Bajars | 260—669 X |
| 3,218,368 | 11/1965 | Neale | 260—680 |

FOREIGN PATENTS

| 1,303,403 | 7/1962 | France. |
| 915,590 | 1/1963 | Great Britain. |

OTHER REFERENCES

Emmett: Catalysis, vol. III, Reinbold Publishing Company, New York, 1955, pages 466, 470 and 481.

DELBERT E. GANTZ, *Primary Examiner.*

C. R. DAVIS, *Assistant Examiner.*